United States Patent
Rossi et al.

(10) Patent No.: US 6,912,347 B2
(45) Date of Patent: Jun. 28, 2005

(54) OPTIMIZED FIBER OPTIC CABLE SUITABLE FOR MICRODUCT BLOWN INSTALLATION

(75) Inventors: Michael T. Rossi, Maiden, NC (US); Olaf Storaasli, Hickory, NC (US); Peter Lausch, Krefeld (DE); Vincent Bourget, Marly le Roi (FR); Aaron Kelly, Hickory, NC (US); George Dallas, Hickory, NC (US)

(73) Assignee: Alcatel, Paris (FR)

( * ) Notice: Subject to any disclaimer, the term of this patent is extended or adjusted under 35 U.S.C. 154(b) by 53 days.

(21) Appl. No.: 10/441,083

(22) Filed: May 20, 2003

(65) Prior Publication Data

US 2004/0096167 A1 May 20, 2004

Related U.S. Application Data

(60) Provisional application No. 60/426,395, filed on Nov. 15, 2002.

(51) Int. Cl.[7] .................................................. G02B 6/44
(52) U.S. Cl. ....................................................... 385/112
(58) Field of Search ................................ 385/100–108, 385/112–113, 123, 126–128, 134, 141

(56) References Cited

U.S. PATENT DOCUMENTS

| | | | |
|---|---|---|---|
| 4,796,970 A | 1/1989 | Reeve et al. | |
| 4,930,860 A | 6/1990 | Tansey et al. | |
| 4,976,519 A | 12/1990 | Davey et al. | |
| 5,042,907 A | 8/1991 | Bell et al. | |
| 5,181,271 A | 1/1993 | Jenkins | |
| 5,533,164 A | 7/1996 | Preston et al. | |
| 5,555,335 A | 9/1996 | Barker et al. | |
| 5,557,703 A | 9/1996 | Barker et al. | |
| 5,851,450 A | 12/1998 | Rennie et al. | |
| 6,022,620 A | 2/2000 | Wells et al. | |
| 6,160,940 A | 12/2000 | Summers et al. | |
| 6,205,277 B1 * | 3/2001 | Mathis et al. | 385/106 |
| 2002/0136509 A1 | 9/2002 | Watson | |
| 2002/0197031 A1 * | 12/2002 | Nechitailo | 385/112 |
| 2003/0035635 A1 * | 2/2003 | Chastain et al. | 385/112 |

* cited by examiner

Primary Examiner—Javaid H. Nasri
(74) Attorney, Agent, or Firm—Sughrue Mion, PLLC

(57) ABSTRACT

A fiber optic cable with optical fibers stranded around a central strength member, and surrounded outer jacket made of a low coefficient of friction material and thinly constructed to show the profile of the stranded shape of the optical lines through the jacket, to thereby form a textured surface.

26 Claims, 2 Drawing Sheets

OPTIMIZED FIBER OPTIC CABLE SUITABLE FOR MICRODUCT BLOWN INSTALLATION

This application claims the benefit of U.S. Provisional Application 60/426,395 filed Nov. 15, 2002, the disclosure of which is incorporated herein by reference.

TECHNICAL FIELD

This invention generally relates to electrical or other communication signal carriers, such as optical cables. More specifically, this invention relates to an optimized stranded optical cable design with a textured outer surface and low friction jacket material suitable for installation into microducts via blown installation.

BACKGROUND

Conventionally, fiber optic cables (~15 mm O.D.) were installed in standard underground ducts (1.25 in/32 mm I.D.) by pulling cables through the ducts. This installation procedure caused a significant amount of force to be applied on the cable due to friction inherent in a pulling installation. Thus, a new method for installing fiber optic cables was developed that utilized compressed air blown into the duct to install the cable (i.e., "blown installation"). This procedure is almost stress-free to the cable, as only a minimal force is applied to the cable during installation.

Further, the use of standard ducts and conventional fiber optic cables failed to maximize the volume available in the duct. Thus, a new approach utilizing very small ducts (i.e., "microducts") has been developed. As shown in FIG. 1, the available space in standard ducts 10 is increased by the provision of microducts 12 (i.e., 12 mm OD) within standard ducts 10. Fiber optic cables 14 sized to fit within microducts 12 (i.e., microcables) are then installed.

FIG. 1 also illustrates one of the benefits of microduct technology, inasmuch as it allows microducts to be installed in ducts that already have existing cables. Thus, in congested urban areas, a duct that was once thought to be full can have more cables installed in it.

Designing and developing a cable optimized for microduct technology involves a balance of several parameters. In addition to standard design parameters of fiber optic cables to meet environmental and physical conditions, the cable must also be designed for the blowing installation in the microducts.

Prior art cables designed for microducts are generally of a central tube type, in which optical fibers are provided in the center of the optical cable. This central tube type cable has been used because it has been the only means by which a high fiber density (e.g., 72 f) could be achieved in a small diameter cable (e.g., 8 mm). It has heretofore been impossible to manufacture a loose tube (i.e., wherein fibers are loose within the buffer tubes) cable small enough to be effectively used within microducts, while still achieving a high fiber density.

The central tube cables have strength members to prevent the cable from "folding over" or buckling within the microduct during installation, which are positioned radially outward from the centrally located optical units. This combination of optical units and strength members are then covered by a jacket, made of a plastic material such as High Density Polyethylene ("HDPE"), and having a smooth outer surface.

However, such central tube type designs suffer many disadvantages. Although the radial strength members provide good axial reinforcement for the optical cable, they also greatly inhibit the ability of the cable to bend during installation. Further, if the strength members are not applied axi-symmetrically, there are preferential bending directions of the cable. These characteristics degrade the ability of such cables to be used in blown installations. Further, the conventional jacket material, along with the jacket's smooth outer surface, impedes the ability to use blown installation, because of the high friction and large surface area contact between the jacket's outer surface and the inner surface of the microduct, and the lack of friction between the smooth jacket and air or other fluid passing over the cable. Lastly, the requirement of axially placed strength members degrades the amount of area available for optical units, and therefore has a corresponding decrease in the cable's optical performance.

The present invention is directed to overcoming one or more of the problems as set forth above.

SUMMARY OF THE INVENTION

It is, therefore, desirable to provide a fiber optic cable comprising optical fibers stranded around a central strength member, which may be surrounded by a thin, low coefficient of friction outer jacket constructed to show the profile of the stranded shape of the optical lines through the jacket, to thereby form a textured surface.

In one aspect of the invention, an optical cable is provided, comprising: a central strength member; optical units stranded around said central strength member; and an outer jacket of a substantially constant thickness; wherein said outer jacket is disposed around said optical units stranded around said central strength member in such a way so as to reproduce the shape of the stranded optical units in said outer jacket and thereby form a textured outer surface.

In another aspect of the invention, said outer jacket is 1.0 mm or less thick.

In another aspect of the invention, said outer jacket is 0.5 mm or less thick.

In another aspect of the invention, said outer jacket comprises a low coefficient of friction material.

In another aspect of the invention, said coefficient of friction is less than 0.34.

In another aspect of the invention, said optical units are stranded helically.

In another aspect of the invention, said optical units are stranded in a reverse oscillated lay.

In another aspect of the invention, said cable has a periodic undulations per inch between 0.5 and 10.

In another aspect of the invention, said cable has a periodic undulations per inch between 2.5 and 6.

In another aspect of the invention, said textured outer surface is in a repeating wave-like pattern.

In another aspect of the invention, a method of constructing the optical cable is provided, comprising: arranging a central strength member; stranding optical units around said central strength member; and covering said optical units stranded around said central strength member with a thin outer jacket of a substantially constant thickness so that the shape of the stranded optical units is reproduced in said outer jacket and forms a textured outer surface on said outer jacket.

In another aspect of the invention, the method further comprises stranding the optical units helically.

In another aspect of the invention, the method further comprises stranding the optical units in a reverse oscillated lay.

BRIEF DESCRIPTION OF THE DRAWINGS

The advantages, nature and various additional features of the invention will appear more fully upon consideration of the illustrative embodiment of the invention which is schematically set forth in the drawings, in which.

DETAILED DESCRIPTION

Figure 1:
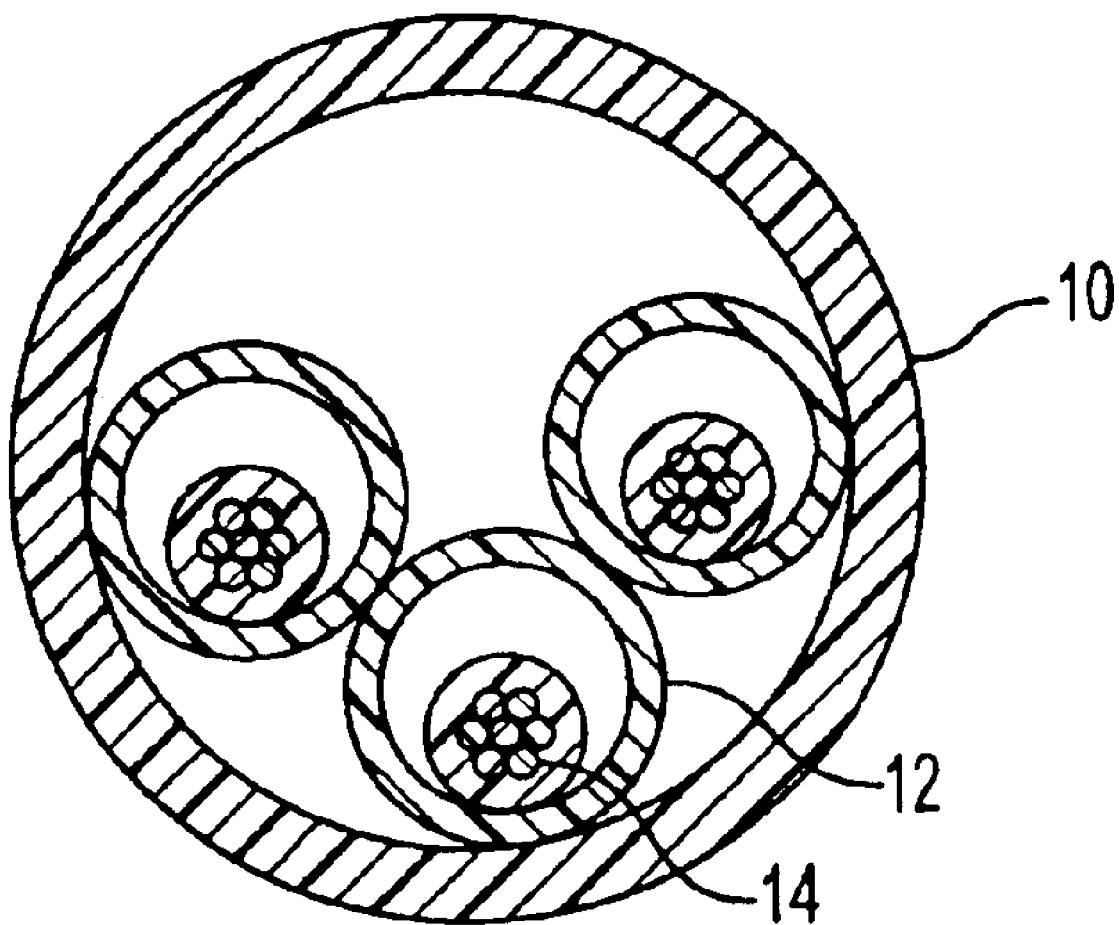
FIG. 1 shows a cross section of a standard duct with microducts therein.

While the invention is open to various modifications and alternative forms, specific embodiments thereof are shown by way of examples in the drawings and are described herein in detail. There is no intent to limit the invention to the particular forms disclosed.

In one embodiment, the proposed cable design provides improved usability, due to the provision of a central strength member, which minimizes bending stiffness and has no preferential bending plane, yet provides sufficient axial stiffness to prevent the cable from buckling during installation. Axial stiffness minimizes cable expansion and contraction during temperature extremes.

The proposed cable design also helps to provide increased blowing performance. For example, the cable may include a low coefficient of friction jacket material, which decreases the friction between the cable and the duct, thereby increasing the blowing performance.

Further, the cable may include a textured outer surface to help increase blowing performance. In one embodiment, such a surface is provided by applying a very thin outer jacket over a shaped cable core. Because the jacket is thin, the components under the cable are evident through the cable jacket. An exemplary embodiment of this structure would be a jacket that is "shrink-wrapped" over the cable core. This textured surface decreases surface area contact between the cable and the duct in which it is being installed, which increases installation distance opportunity and provides a means for mid-span access.

Additionally, during a blown installation, the textured surface profile generates friction between the air (or other fluid) passing over it and the cable by generating turbulent flow that "catches" the cable. This friction generates a force that essentially pushes the cable into the duct.

Lastly, the proposed cable design has improved functionality because it has an increased transmission-operating window as compared to central tube type designs of similar diameter.

Figure 2:
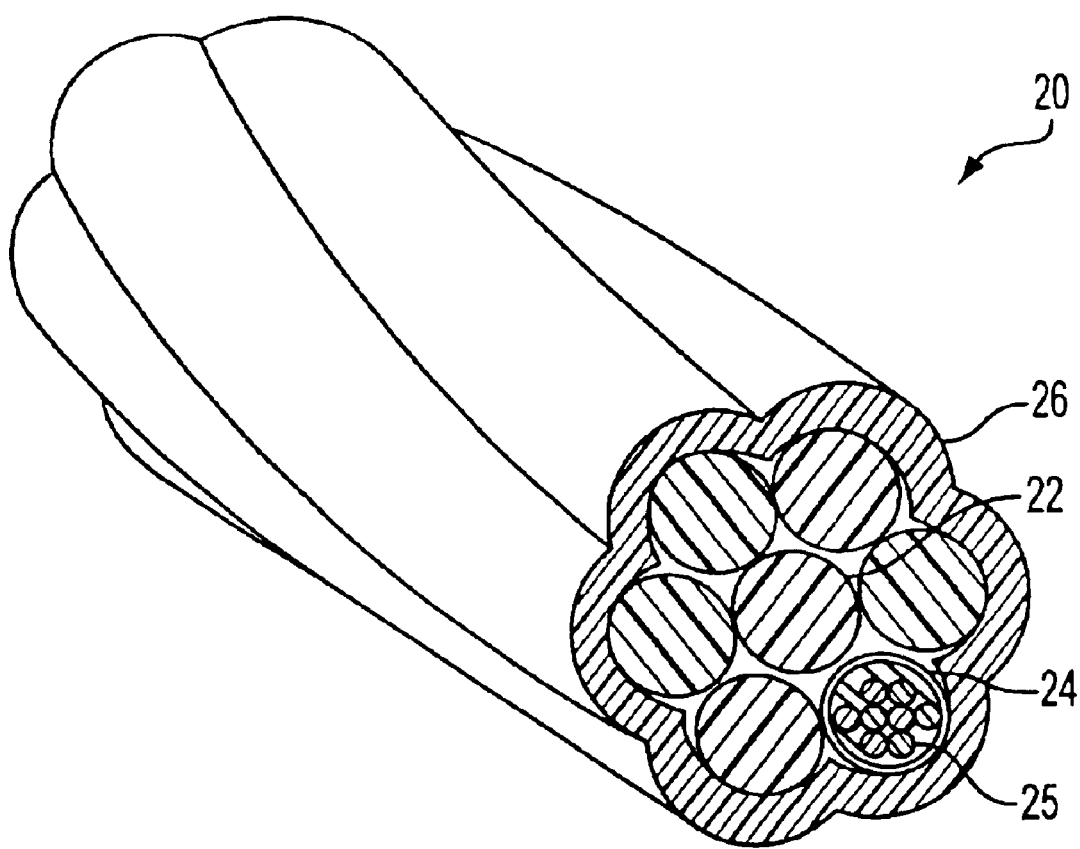
FIG. 2 shows a perspective view of the cable of the invention.

FIG. 2 shows a perspective view of an exemplary embodiment of a stranded type cable according to the invention. In this embodiment, the central strength member 22 is made of glass reinforced plastic (GRP), and is provided in the center of fiber optic cable 20. Optical units 24 are provided radially outward from strength member 22, and may contain one or more optical fibers 25. Optical units 24 are stranded around the central strength member. The stranding can be accomplished in one direction, helically, known as "S" stranding, or Reverse Oscillated Lay stranding, known as "S-Z" stranding (or any other applicable stranding configuration). This stranding about the central strength member increases the operational and installation flexibility of fiber optic cable 20 as compared to the central tube type alternatives. For example, the "S-Z stranded" configuration normalizes the forces built into the cable by periodically reversing the buffer tube winding direction to provide flexibility and also allows easy unraveling of the tubes for mid-span access (at least as compared with non-stranded cables wherein tubes or fibers may be difficult to untangle).

Further, a very tight laylength (e.g., 60 mm) may optionally be provided to ensure that the fiber optic cable has the operational window necessary to perform at low temperatures (e.g., −40 C), and to provide the other desired tensile properties described herein. Such a tight laylength also provides a very frequent set of periodic undulations (i.e., peaks and valleys) along the axial direction of the fiber optic cable, which is transferred through the thin outer jacket to create a textured outer surface of the cable, as discussed in detail below. These undulations, or waves, improve the blown performance of the cable for the reasons discussed below. A value of between 0.5 and 10 periodic undulations per inch ("PUI"), or more preferably between 2.5 and 6, has been determined to provide optimal blown performance, along with the desired mechanical and environmental properties for a fiber optic cable.

Additionally, the positioning of strength member 22 in the center of fiber optic cable 20 (in this exemplary embodiment) maximizes blowing performance. The central position balances and optimizes the cable bending and axial stiffness. When cables are installed using the blowing method, it is preferable that the cable have a balance of low bending stiffness such that the cable will easily go around bends or turns in the duct, yet also have enough stiffness to be pushed into the duct without "folding over" or buckling. In this embodiment, the use of a central strength member helps to minimize the bending stiffness, yet the axial stiffness is sufficient enough such that the cable will not buckle in the duct.

In this exemplary embodiment, surrounding central strength member 22 and optical units 24 is thin jacket 26, which is of substantially constant thickness in this example. Other embodiments may provide a varying thickness jacket. In one embodiment, the jacket is made of a low coefficient of friction material. Such low coefficient of friction materials have friction factors equal to or less than 0.34 (less than 0.14 with the use of lubrication). In fact, friction factors as low as 0.23 (unlubricated) and 0.06 (lubricated) have been shown by use of various materials, and the lower limit is only restrained by the material choice. This low friction material greatly improves the resistance to blow installation caused by friction between the jacket material and the duct in which it is being installed.

For example, in one embodiment of the invention, the jacket is made of Nylon 12. Test data has shown that the friction coefficient between the prior art HDPE duct and a cable with Nylon 12 outer jacket is over 20% less than the friction coefficient of a cable with a HDPE outer jacket. Additionally, other materials with a low coefficient of friction, such as a modified HDPE and polypropylene, have also shown increased performance and may be used with the invention. Still further materials that may be used include Ultra-High Molecular weight PE, Polyethylene with silicone additives, and PE with graphite additives.

Additionally (in one embodiment), if a low Coefficient of Thermal Expansion ("CTE") and high modulus material is used for jacket 26 (in combination with its thinness described above), the performance of the fiber optic cable 20 can be further improved at temperature extremes, due to the reduced amount of plastic material. Specifically, with a thin jacket, the cable is less sensitive to expansion and contraction at temperature extremes. For example, testing has shown that, by utilizing a jacket according to the invention, cable contraction at a lower end of the cable's thermal operating range (~-40° C.) has been reduced as much as 65% from a similar dielectric cable with a standard jacket size.

In one embodiment (as shown in FIG. 2), jacket 26 is thin enough that the profile of the stranded shape of optical lines 24 below jacket 26 is evident. Exemplary embodiments of jacket thicknesses are 1.0 mm or less, or more preferably 0.5 mm or less. This thinness of jacket 26 provides a structure for cable 20 that approximates a construction wherein the jacket is "shrink-wrapped" over the stranded shape of optical lines 24.

In this embodiment, due to the thinness of jacket 26, the outer surface of jacket 26 periodically varies along the axial direction of cable 20 in a fashion that mimics the stranded shape of optical lines 24 (See FIG. 2). This varying outer surface provides the cable's textured outer surface, or textured profile, of the invention. Of course, various other constructions that vary the surface of jacket 26 in a continuous or interrupted pattern are also possible.

The textured profile of jacket 26 provided in this embodiment further optimizes the cable for blow installation. Specifically, the textured profile reduces the contact surface between the cable and the duct in which it is being installed, which reduces the friction between the cable and the duct (thus increasing the blowing performance). The textured profile also provides an aerodynamic benefit. Specifically, in blown installations, the friction between the air and the cable should be maximized. The greater the friction between the moving air and the cable, the greater the speeds at which the cable can be installed, which in turn means that the cable can be installed over greater distances. The textured cable profile generates this friction between the cable and the air, thus improving the blowing performance than that of a smooth cable.

Embodiments of the invention may be provided in various sizes, depending on the microduct in which it is being installed. Table 1 summarizes the designs for various embodiments, based upon a given microduct size (ID). These various sizes are used to provide an optimized "Fill Ratio," or the ratio of the cable diameter to the duct inner diameter. Fill Ratios of up to 90% have been successfully tested.

| Microduct ID | Cable OD | Cable Weight | Fiber Count | Fiber/Cable Density | Fiber/Duct Area Density |
|---|---|---|---|---|---|
| 8 mm | <7.0 mm | <40 kg/km | 1 f to 72 f | Up to 2.8 fibers/mm$^2$ | Up to 1.4 fibers/mm$^2$ duct |
| 10 mm | <8.0 mm | <50 kg/km | 1 f to 72 f | U to 2.2 fibers/mm$^2$ | Up to 1.0 fibers/mm$^2$ duct |
| 11 mm | <9.0 mm | <70 kg/km | 1 f to 96 f | Up to 2.0 fibers/mm$^2$ | Up to 1.1 fibers/mm$^2$ duct |
| 13 mm | <11.5 mm | <105 kg/km | 1 f to 144 f | Up to 1.7 fibers/mm$^2$ | Up to 1.1 fibers/mm$^2$ duct |

Various embodiments of the cable design are also novel because they have a very high fiber to cable area density, as high as 2.8 fibers per square millimeter of cable in a stranded design. This high fiber to cable area density may be necessary to meet performance requirements for the telecommunication industry, which have heretofore only been attainable by use of central-tube type cables, with all of their inherent structural, functional, and installation disadvantages.

It is of course understood that departures can be made from the preferred embodiment of the invention by those of ordinary skill in the art without departing from the spirit and scope of the invention that is limited only by the following claims.

What is claimed is:

1. An optical cable comprising:

a central strength member;

optical units stranded around said central strength member; and a protective outer jacket of a substantially constant thickness;

wherein said outer jacket is wrapped around said optical units stranded around said central strength member in such a way so as to reproduce the shape of the stranded optical units in said outer jacket and thereby form a textured outer surface of said optical cable by creating circumferential peaks and valleys.

2. An optical cable as recited in claim 1, wherein said outer jacket is 1.0 mm or less thick.

3. An optical cable as recited in claim 1, wherein said outer jacket is 0.5 mm or less thick.

4. An optical cable as recited in claim 1, wherein said outer jacket comprises a low coefficient of friction material.

5. An optical cable as recited in claim 4, wherein said coefficient of friction is less than 0.34.

6. An optical cable as recited in claim 1, wherein said optical units are stranded helically.

7. An optical cable as recited in claim 1, wherein said optical units are stranded in a reverse oscillated lay.

8. An optical cable as recited in claim 1, wherein said cable has a periodic undulations per inch between 0.5 and 10.

9. An optical cable as recited in claim 1, wherein said cable has a periodic undulations per inch between 2.5 and 6.

10. An optical cable as recited in claim 1, wherein said textured outer surface is in a repeating wave-like pattern.

11. A method of constructing an optical cable, comprising:

arranging a central strength member;

stranding optical units around said central strength member; and covering said optical units stranded around said central strength member with a thin protective outer jacket of a substantially constant thickness so that the shape of the stranded optical units is reproduced in said outer jacket and forms a textured outer surface of said optical cable by creating circumferential peaks and valleys.

12. A method of constructing an optical cable as recited in claim 11, wherein said optical units are stranded helically.

13. A method of constructing an optical cable as recited in claim 11, wherein said optical units are stranded in a reverse oscillated lay.

14. A method of constructing an optical cable as recited in claim 11, wherein said outer jacket is 1.0 mm or less thick.

15. A method of constructing an optical cable as recited in claim 11, wherein said outer jacket is 0.5 mm or less thick.

16. A method of constructing an optical cable as recited in claim 11, wherein said outer jacket comprises a low coefficient of friction material.

17. A method of constructing an optical cable as recited in claim 16, wherein said coefficient of friction is less than 0.34.

18. A method of constructing an optical cable as recited in claim 11, wherein said cable has a periodic undulations per inch between 0.5 and 10.

19. A method of constructing an optical cable as recited in claim 11, wherein said cable has a periodic undulations per inch between 2.5 and 6.

20. A method of constructing an optical cable as recited in claim 11, wherein said textured outer surface is in a repeating wave-like pattern.

21. An optical cable comprising:
   a central strength member;
   optical units stranded around said central strength member;
   an outer jacket of a substantially constant thickness;
   wherein said outer jacket is wrapped around said optical units stranded around said central strength member in such a way so as to reproduce the shape of the stranded optical units in said outer jacket and thereby form a textured outer surface; and
   wherein said cable has a periodic undulations per inch between 0.5 and 10.

22. An optical cable comprising:
   a central strength member;
   optical units stranded around said central strength member;
   an outer jacket of a substantially constant thickness;
   wherein said outer jacket is wrapped around said optical units stranded around said central strength member in such a way so as to reproduce the shape of the stranded optical units in said outer jacket and thereby form a textured outer surface; and
   wherein said cable has a periodic undulations per inch between 2.5 and 6.

23. A method of constructing an optical cable, comprising:
   arranging a central strength member;
   stranding optical units around said central strength member;
   covering said optical units stranded around said central strength member with a thin outer jacket of a substantially constant thickness so that the shape of the stranded optical units is reproduced in said outer jacket and forms a textured outer surface on said outer jacket;
   wherein said cable has a periodic undulations per inch between 0.5 and 10.

24. A method of constructing an optical cable, comprising:
   arranging a central strength member;
   stranding optical units around said central strength member; and
   covering said optical units stranded around said central strength member with a thin outer jacket of a substantially constant thickness so that the shape of the stranded optical units is reproduced in said outer jacket and forms a textured outer surface on said outer jacket;
   wherein said cable has a periodic undulations per inch between 2.5 and 6.

25. An optical cable as recited in claim 1, wherein the outer jacket is formed of at least one of nylon 12, modified HDPE, polypropelene, ultra-high molecular weight PE, polyethelene with silicone additives, and PE with graphite additives.

26. A method of constructing an optical cable as recited in claim 11, wherein said outer jacket is formed of at least one of nylon 12, modified HDPE, polypropelene, ultra-high molecular weight PE, polyethelene with silicone additives, and PE with graphite additives.

* * * * *